US008737834B2

(12) United States Patent
Boyd et al.

(10) Patent No.: US 8,737,834 B2
(45) Date of Patent: May 27, 2014

(54) METHOD AND SYSTEM FOR OPTICAL PERFORMANCE MONITORING IN ETHERNET PASSIVE OPTICAL NETWORKS

(75) Inventors: Edward W. Boyd, Petaluma, CA (US); Sanjay Goswami, Santa Rosa, CA (US)

(73) Assignee: Broadcom Corporation, Irvine, CA (US)

( * ) Notice: Subject to any disclaimer, the term of this patent is extended or adjusted under 35 U.S.C. 154(b) by 604 days.

(21) Appl. No.: 12/824,886

(22) Filed: Jun. 28, 2010

(65) Prior Publication Data

US 2010/0329668 A1 Dec. 30, 2010

Related U.S. Application Data

(60) Provisional application No. 61/221,293, filed on Jun. 29, 2009.

(51) Int. Cl.
*H04B 10/08* (2011.01)
*H04J 14/00* (2006.01)

(52) U.S. Cl.
USPC ......... 398/25; 398/16; 398/9; 398/38; 398/72

(58) Field of Classification Search
USPC .................................................. 398/9, 17, 25
See application file for complete search history.

(56) References Cited

U.S. PATENT DOCUMENTS

| | | | |
|---|---|---|---|
| 2007/0002745 A1* | 1/2007 | Ossman et al. | 370/235 |
| 2007/0150126 A1* | 6/2007 | Crank | 701/4 |
| 2008/0231711 A1* | 9/2008 | Glen et al. | 348/192 |
| 2009/0010643 A1* | 1/2009 | DeLew et al. | 398/17 |
| 2010/0098413 A1* | 4/2010 | Li et al. | 398/38 |

* cited by examiner

*Primary Examiner* — Oommen Jacob
(74) *Attorney, Agent, or Firm* — Sterne, Kessler, Goldstein & Fox, PLLC

(57) ABSTRACT

One embodiment provides a system that tests optical performance in an Ethernet passive optical network (EPON), which includes an optical line terminal (OLT) and at least one optical network unit (ONU). The system configures an ONU with a circular queue that contains test frames for testing optical performance. The OLT then notifies the ONU to transmit test frames at a specified data rate for a specified duration. After receiving test frames at the OLT, the system measures frame loss and/or bit error rate based on the received test frames.

18 Claims, 6 Drawing Sheets

METHOD AND SYSTEM FOR OPTICAL PERFORMANCE MONITORING IN ETHERNET PASSIVE OPTICAL NETWORKS

CROSS-REFERENCE TO RELATED APPLICATIONS

This application claims benefit to U.S. Provisional Patent Application No. 61/221,293, filed on Jun. 29, 2009, entitled "Optical Fault Detection," which is incorporated herein by reference in its entirety.

BACKGROUND OF THE INVENTION

1. Field of the Invention

This disclosure is generally related to the design of Ethernet passive optical networks. More specifically, this disclosure is related to a method and system for optical performance monitoring in Ethernet passive optical networks.

2. Related Art

In order to keep pace with increasing Internet traffic, network operators have widely deployed optical fibers and optical transmission equipment, substantially increasing the capacity of backbone networks. A corresponding increase in access network capacity, however, has not matched this increase in backbone network capacity. Even with broadband solutions, such as digital subscriber line (DSL) and cable modem (CM), the limited bandwidth offered by current access networks still presents a severe bottleneck in delivering high bandwidth to end users.

Among different competing technologies, Ethernet passive optical networks (EPONs) are one of the best candidates for next-generation access networks. EPONs combine ubiquitous Ethernet technology with inexpensive passive optics, offering the simplicity and scalability of Ethernet with the cost-efficiency and high capacity of passive optics. With the high bandwidth of optical fibers, EPONs can accommodate broadband voice, data, and video traffic simultaneously. Such integrated service is difficult to provide with DSL or CM technology. Furthermore, EPONs are more suitable for Internet Protocol (IP) traffic, because Ethernet frames can directly encapsulate native IP packets with different sizes, whereas ATM passive optical networks (APONs) use fixed-size ATM cells and consequently require packet fragmentation and reassembly.

Typically, EPONs are used in the "first mile" of the network, which provides connectivity between the service provider's central offices and business or residential subscribers. The "first mile" is generally a logical point-to-multipoint network, where a central office serves a number of subscribers. For example, an EPON can adopt a tree topology, wherein one trunk fiber couples the central office to a passive optical splitter/combiner. Through a number of branch fibers, the passive optical splitter/combiner divides and distributes downstream optical signals to subscribers and combines upstream optical signals from subscribers (see FIG. 1).

Transmissions within an EPON are performed between an optical line terminal (OLT) and optical network units (ONUs). The OLT generally resides in the central office and couples the optical access network to a metro backbone, which can be an external network belonging to, for example, an Internet service provider (ISP) or a local exchange carrier. An ONU can reside either at the curb or at an end-user location, and can provide broadband voice, data, and video services. ONUs are coupled to a one-by-N (1×N) passive optical coupler, where N is the number of ONUs, and the passive optical coupler is coupled to the OLT over an optical link. One may use a number of cascaded optical splitters/couplers to increase the number of ONUs. This configuration can significantly save on the number of fibers and amount of hardware.

Communications within an EPON include downstream traffic and upstream traffic. In the following description, "downstream" refers to the direction from an OLT to one or more ONUs, and "upstream" refers to the direction from an ONU to the OLT. In the downstream direction, because of the broadcast nature of the 1×N passive optical coupler, data packets are broadcast by the OLT to all ONUs and are selectively extracted by their destination ONUs. Moreover, each ONU is assigned one or more logical link identifiers (LLIDs), and a data packet transmitted by the OLT typically specifies the LLID of the destination ONU. In the upstream direction, the ONUs need to share channel capacity and resources, because there is only one link coupling the passive optical coupler to the OLT.

Deployment of EPON-based access networks carrying critical services such as video and VoIP demands the networks to be up all the time. EPONs, by design, have no active components between the central office and subscribers. This provides carriers a huge advantage when it comes to keeping the networks up and running. However, ONU lasers deteriorate over time. Weak laser signals can cause frame loss due to bit errors. It is often difficult to isolate a weak transceiver from the central office in a working EPON.

SUMMARY OF THE INVENTION

One embodiment provides a system that tests optical performance in an Ethernet passive optical network (EPON), which includes an optical line terminal (OLT) and at least one optical network unit (ONU). The system configures an ONU with a circular queue that contains test frames for testing optical performance. The OLT then notifies the ONU to transmit test frames at a specified data rate for a specified duration. The system subsequently measures frame loss and/or bit error rate based on the received test frames.

In a variation of this embodiment, the system performs MAC-layer optical performance testing during a maintenance window of the EPON, wherein the test frames include operation, administration, and maintenance (OAM) messages with an LLID assigned to the ONU for data communication.

In a variation of this embodiment, the system performs continuous optical performance testing, wherein the test frames include OAM messages with a dedicated LLID assigned to the ONU.

In a variation of this embodiment, the specified data rate for transmitting test frames is the full line rate.

In a variation of this embodiment, the specified duration for transmitting test frames is approximately 30 seconds.

In a variation of this embodiment, the system generates test frames at the OLT.

In a variation of this embodiment, the system removes testing frames after they are received.

BRIEF DESCRIPTION OF THE FIGURES

In the figures, like reference numerals refer to the same figure elements.

DETAILED DESCRIPTION OF THE INVENTION

Figure 1:
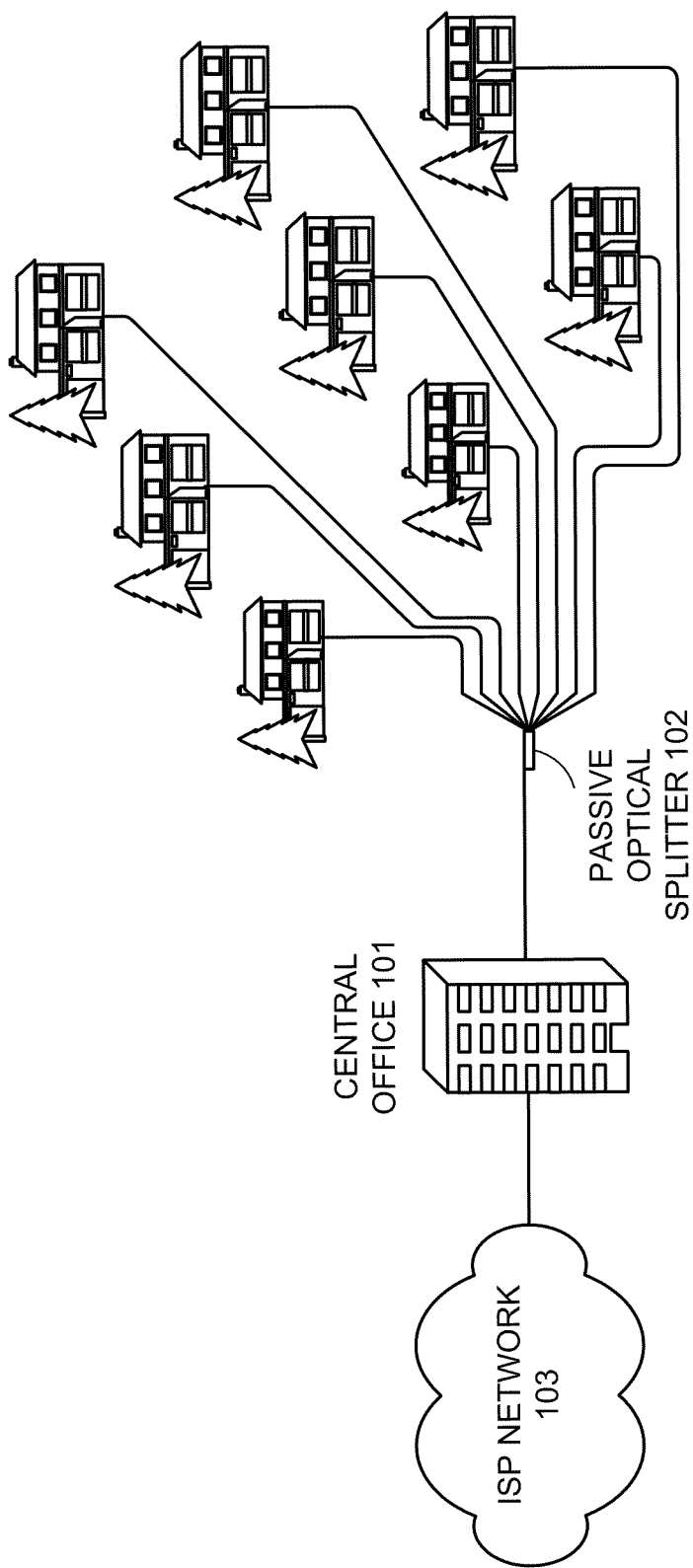
FIG. 1 illustrates an EPON, wherein a central office and a number of subscribers are coupled through optical fibers and a passive optical splitter (prior art).

FIG. 1 illustrates an EPON including a central office and a number of subscribers coupled through optical fibers and a passive optical splitter (prior art). A passive optical splitter 102 and optical fibers couple the subscribers to a central office 101. Passive optical splitter 102 can reside near end-user locations to minimize the initial fiber deployment costs. Central office 101 can couple to an external network 103, such as a metropolitan area network operated by an Internet service provider (ISP). Although FIG. 1 illustrates a tree topology, a PON can also be based on other topologies, such as a logical ring or a logical bus.

Figure 2:
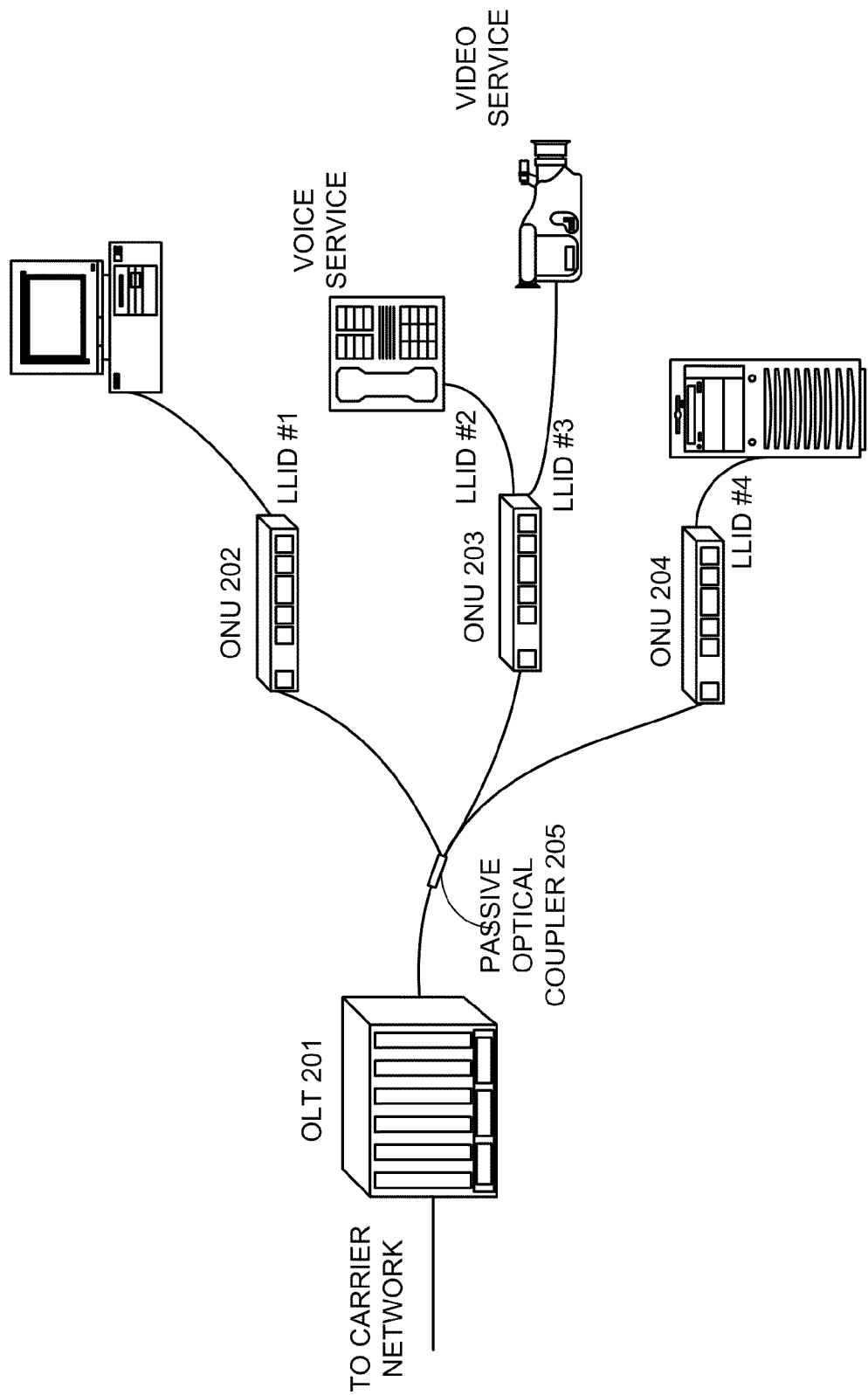
FIG. 2 illustrates an EPON, including an OLT and ONUs, in accordance with an embodiment of the present invention (prior art).

FIG. 2 illustrates an EPON including a single OLT and multiple ONUs (prior art). OLT 201 is coupled with ONUs 202, 203, and 204 through optical fibers and a passive optical coupler 205. As is illustrated in FIG. 2, an ONU can accommodate a number of networked devices, such as personal computers, telephones, video equipment, network servers, etc. One or more networked devices belonging to the same class of service are typically assigned a logical link identifier (LLID), as defined in the IEEE 802.3 standard. An LLID establishes a logical link between an ONU and an OLT, which accommodates specific service level agreement (SLA) requirements. In this example, LLID #1 is assigned to regular data services for ONU 202; LLID #2 is assigned to voice services for ONU 203; LLID #3 is assigned to video services for ONU 203; and LLID #4 is assigned to mission-critical data services for ONU 204.

Lasers on OLT and ONU ports are susceptible to aging or degradation. Optical performance in EPON deteriorates slowly over time, which may cause bit errors and frame loss. Service providers are recognizing the need to add preventive and diagnostic functionalities to avoid lengthy service outages and expensive field repairs. Optical performance monitoring can be achieved by directly measuring transceivers' optical power at OLTs and ONUs through a digital diagnostics monitoring interface (DDMI). However, existing OLTs and ONUs in an EPON may not have DDMI hardware support to monitor optical performance. Embodiments of the present invention provide a software-based method for monitoring optical performance in EPONs.

In one embodiment of the present invention, a circular queue in the ONU containing test frames is configured by the network operator to produce test bits for a certain duration, for example, approximately 30 seconds. The network operator can increase the data rate for the bits stored in the circular queue in the ONU up to the full line rate. The test frames in the circular queue are transmitted to the corresponding OLT at the rate specified by the network operator for the specified duration. The received test frames can be later removed by the OLT. With healthy ONU transceivers, the network operator will not observe any bit errors or frame losses, whereas with weak transceivers the network operator will observe bit errors and frame losses. Statistics collected at the OLT and the ONU can be used to measure the bit error rate and frame loss at the media access control (MAC) layer. This software-based optical performance monitoring can be performed independently or as a complementary method to the physical layer power monitoring.

In some embodiments, frame loss measurements are conducted on a per-LLID basis to monitor optical performance for a particular ONU port. A circular queue in the ONU containing test frames with a specific LLID functions as a frame generator to provide traffic from the client side. In other embodiments, a frame generator, which can generate frames at a data rate up to the full line rate, can be configured at the OLT in order to measure optical performance at the receiving ONUs.

When an EPON is first powered up, or when new ONUs join the PON, the ONUs notify the OLT of their existence and capabilities. The OLT then assigns unique LLIDs and bandwidth to the ONUs, and coordinates the communication among the ONUs over the shared optical medium. Furthermore, a discovery process of operations, administration, and maintenance (OAM) provides mechanisms to monitor link status between the OLT and the ONUs. OAM messages can also set the duration of the optical monitoring. For example, a 30-second maintenance window can be set for optical performance testing during which service is disrupted. The transmission rate of the test frame can be set at up to the full line speed, such as the rate defined by the service level agreements (SLAs) of the LLIDs. The test frame follows the standard format defined in ITU-T Y.1731. Since the frame-based service is connectionless, support for sequence number can be optional for the test frames.

Figure 3:
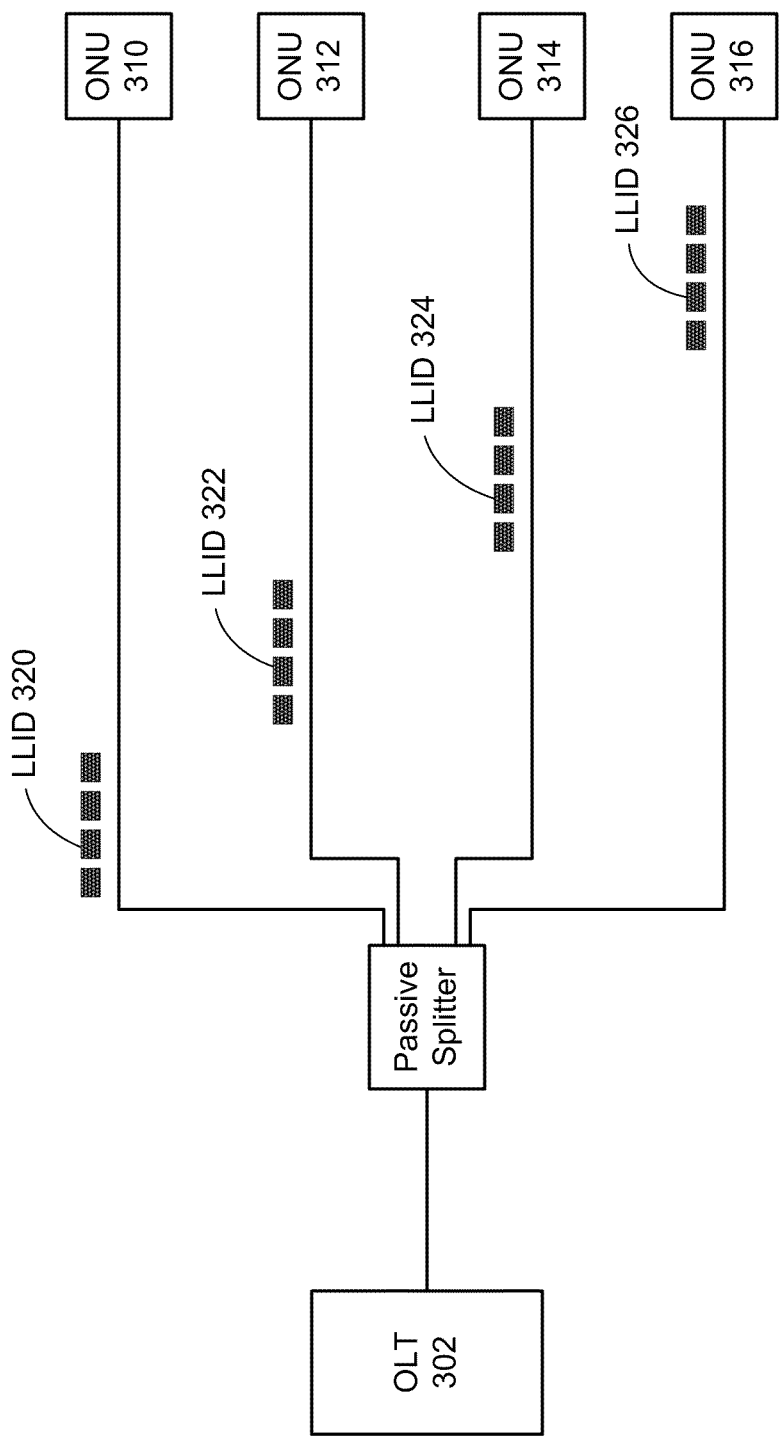
FIG. 3 illustrates an example of optical performance testing during a maintenance window in an EPON in accordance with an embodiment of the present invention.

FIG. 3 illustrates an example of optical performance testing during a maintenance window in an EPON in accordance with an embodiment of the present invention. ONUs 310, 312, 314, and 316 are coupled to OLT 302 through a passive splitter. A unique LLID is assigned to each ONU for data transmission. During the maintenance window, test frames are transmitted from an ONU using the same LLID assigned for data service. For example, test frames from ONU 310 are transmitted to OLT 302 with the same LLID 320 as in data frames at a speed specified by the network operator. During the maintenance window for ONU 314, test frames are transmitted with LLID 324. Regular data service is not available during these maintenance windows.

Figure 4:
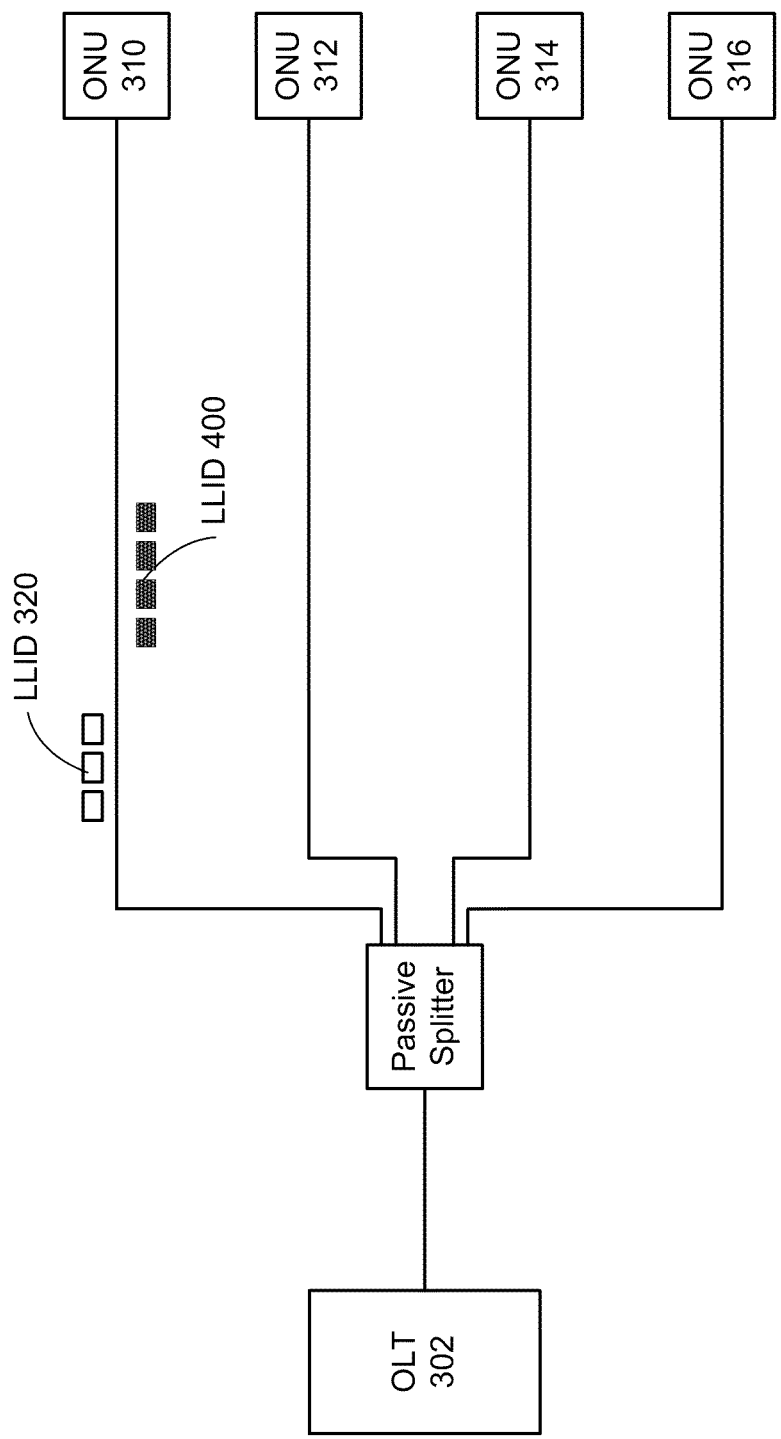
FIG. 4 illustrates an example of continuous optical performance testing with a dedicated LLID in an EPON in accordance with an embodiment of the present invention.

In some other embodiments, continuous optical monitoring can be achieved by assigning a dedicated LLID for monitoring. FIG. 4 illustrates an example of continuous optical performance testing with a dedicated LLID in an EPON in accordance with an embodiment of the present invention. An LLID 400 is assigned for optical monitoring only. ONU 310 transmits data with LLID 320. When ONU 310 is idle, test frames are transmitted with dedicated LLID 400. Excess bandwidth can be granted to the dedicated LLID so that regular data service is not disrupted during the continuous monitoring.

Figure 5:
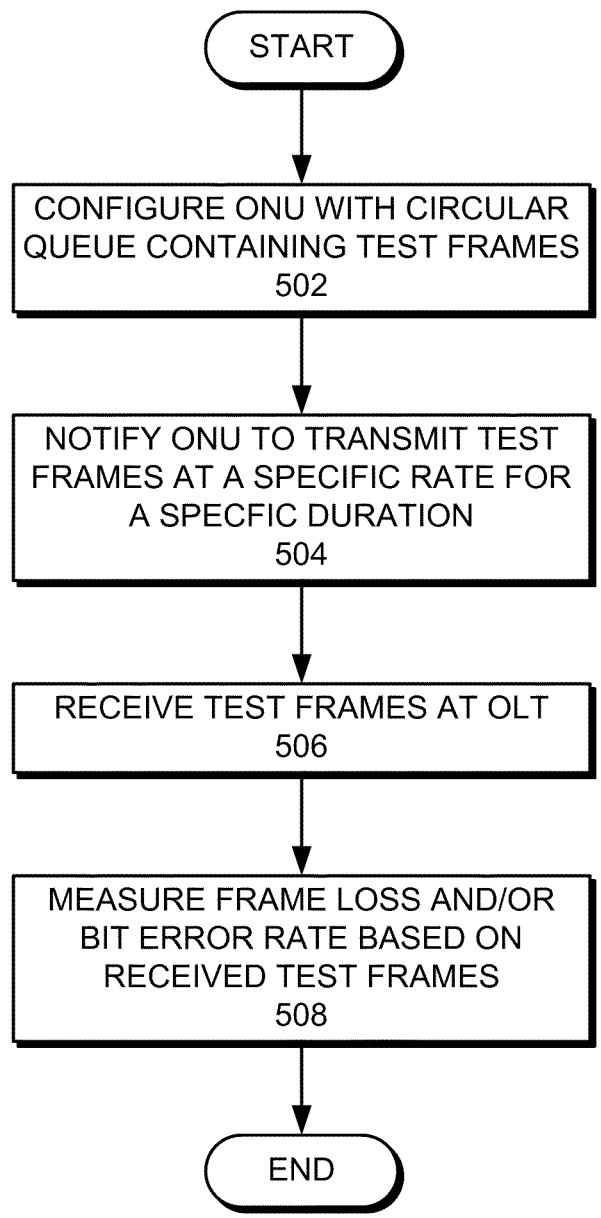
FIG. 5 presents a flow chart illustrating the process of optical performance monitoring in an EPON in accordance with an embodiment of the present invention.

FIG. 5 presents a flow chart illustrating the process of optical performance monitoring in an EPON in accordance with an embodiment of the present invention. During operation, the system first configures the ONU with a circular queue containing test frames (operation 502). The system then notifies the ONU to transmit test frames at a specific rate for a specific duration (operation 504). Next, the OLT receives the test frames (operation 506). The system subsequently measures frame loss and/or bit error rate based on the received test frames (operation 508).

Figure 6:
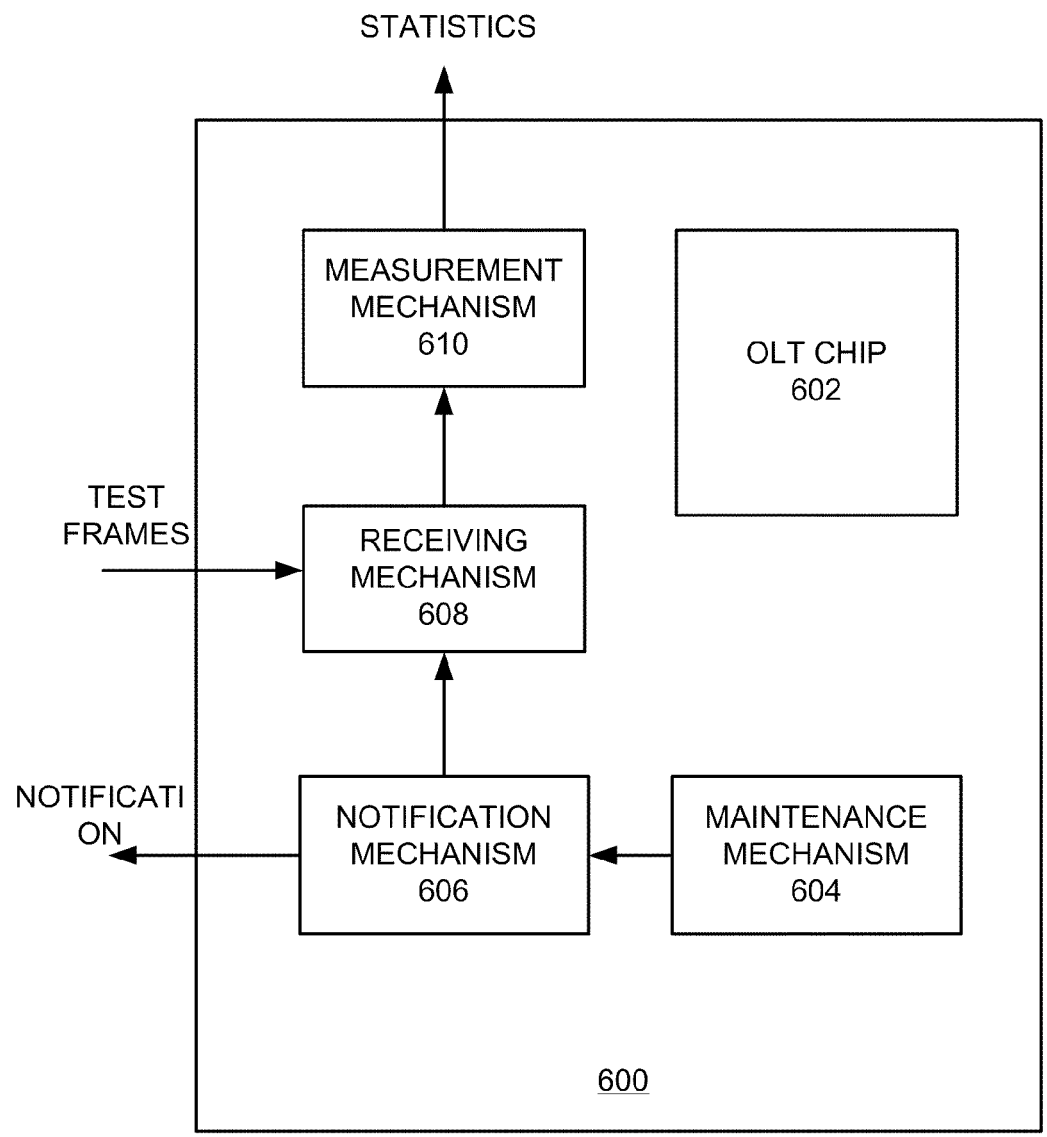
FIG. 6 presents a diagram illustrating an exemplary system for optical performance monitoring in an EPON in accordance with an embodiment of the present invention.

FIG. 6 presents a diagram illustrating an exemplary system for optical performance monitoring in an EPON in accordance with an embodiment of the present invention. Optical performance monitoring system 600 includes an OLT chip 602, a maintenance mechanism 604, a notification mechanism 606, a receiving mechanism 608, and a measurement mechanism 610. During operation, OLT chip 600 maintains an optical performance monitoring schedule. When the monitoring is on schedule, maintenance mechanism 604 informs notification mechanism 606 to send out a notification to an ONU to start sending test frames. Receiving mechanism 608 receives test frames, and measurement mechanism 610 collects statistics on frame loss and/or bit error rate based on the received test frames.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for testing optical performance in an Ethernet passive optical network (EPON), the method comprising:
configuring an optical network unit (OLU) with a circular queue that includes test frames for testing optical performance;
notifying the ONU by an optical line terminal (OLT) to transmit the test frames at a specified data rate for a specified duration, wherein the OLT assigns a dedicated logical link identifier (LLID) to the test frames for testing optical performance of the ONU;
receiving the test frames at the OLT; and
measuring frame loss and/or bit error rate based on the received test frames.

2. The method of claim 1, further comprising performing continuous optical performance testing by transmitting the test frames with the dedicated LLID when the ONU is idle.

3. The method of claim 1, wherein the specified data rate for transmitting the test frames is a full line rate.

4. The method of claim 1, wherein the specified duration for transmitting the test frames is approximately 30 seconds.

5. The method of claim 1, further comprising generating the test frames at the OLT.

6. The method of claim 1, further comprising removing the received test frames after they are received.

7. A non-transitory computer-readable storage medium storing instructions that when executed by a computer cause the computer to perform a method for testing optical performance in an Ethernet passive optical network (EPON), the method comprising:
configuring an ONU with a circular queue that includes test frames for testing optical performance;
notifying the ONU by an OLT to transmit the test frames at a specified data rate for a specified duration, wherein the OLT assigns a dedicated logical link identifier (LLID) to the test frames for monitoring optical performance of the ONU;
receiving the test frames at the OLT; and
measuring frame loss and/or bit error rate based on the received test frames.

8. The computer-readable storage medium of claim 7, wherein the method further comprises performing continuous optical performance testing by transmitting the test frames with the dedicated LLID when the ONU is idle.

9. The computer-readable storage medium of claim 7, wherein the specified data rate for transmitting the test frames is a full line rate.

10. The computer-readable storage medium of claim 7, wherein the specified duration for transmitting the test frames is approximately 30 seconds.

11. The computer-readable storage medium of claim 7, wherein the method further comprises generating the test frames at the OLT.

12. The computer-readable storage medium of claim 7, wherein the method further comprises removing the received test frames after they are received.

13. A system for testing optical performance in an Ethernet passive optical network (EPON), comprising:
an optical network unit (ONU), comprising:
a configuration module to configure the ONU with a circular queue that includes test frames for testing optical performance;
an optical line terminal (OLT), comprising:
a notification module configured to notify the ONU to transmit the test frames at a specified data rate for a specified duration, wherein the OLT assigns a dedicated logical link identifier (LLID) to the test frames for testing optical performance of the ONU; and
an optical transceiver comprising an optical receiver configured to receive the test frames at the OLT; and
a measuring module configured to measure frame loss and/or bit error rate based on the received test frames.

14. The system of claim 13, wherein the measuring module is further configured to perform continuous optical performance testing by transmitting the test frames with the dedicated LLID when the ONU is idle.

15. The system of claim 13, wherein the specified data rate for transmitting the test frames is a full line rate.

16. The system of claim 13, wherein the specified duration for transmitting the test frames is approximately 30 seconds.

17. The system of claim 13, wherein the OLT further comprises a traffic generation module configured to generate the test frames.

18. The system of claim 13, wherein the measuring module is further configured to remove the received test frames after they are received.

* * * * *

UNITED STATES PATENT AND TRADEMARK OFFICE
CERTIFICATE OF CORRECTION

PATENT NO. : 8,737,834 B2
APPLICATION NO. : 12/824886
DATED : May 27, 2014
INVENTOR(S) : Boyd et al.

Page 1 of 1

It is certified that error appears in the above-identified patent and that said Letters Patent is hereby corrected as shown below:

In the Claims:

In column 5, line 45, replace "OLU" with --ONU--.

In column 6, line 8, replace "an ONU" with --an optical network unit (ONU)--.

In column 6, line 10, replace "an OLT" with --an optical line terminal (OLT)--.

Signed and Sealed this
Fifth Day of August, 2014

Michelle K. Lee
*Deputy Director of the United States Patent and Trademark Office*